United States Patent [19]
Kostiuk

[11] Patent Number: 5,917,159
[45] Date of Patent: Jun. 29, 1999

[54] DYNAMIC LOAD WEIGHING SYSTEM

[75] Inventor: Walter Kostiuk, Markham, Canada

[73] Assignee: Mobile Advanced Scale Systems Corp., Markham, Canada

[21] Appl. No.: 08/870,466

[22] Filed: Jun. 6, 1997

[30] Foreign Application Priority Data

Sep. 20, 1996 [CA] Canada .................................. 2186094

[51] Int. Cl.$^6$ .............................. G01G 19/08; B66C 1/40
[52] U.S. Cl. ............................................ 177/136; 177/147
[58] Field of Search ............................. 177/136, 137, 177/138, 139, 141, 211, 229, 147

[56] References Cited

U.S. PATENT DOCUMENTS

| | | | |
|---|---|---|---|
| 4,421,186 | 12/1983 | Bradley | 177/139 |
| 4,573,362 | 3/1986 | Amlani | 73/862.04 |
| 4,815,547 | 3/1989 | Dillon et al. | 177/211 |
| 5,119,894 | 6/1992 | Crawford et al. | 177/139 |
| 5,178,226 | 1/1993 | Bowman et al. | 177/139 |
| 5,215,155 | 6/1993 | Van der Velden | 177/145 |
| 5,230,393 | 7/1993 | Mezey | 177/139 |
| 5,245,137 | 9/1993 | Bowman et al. | 177/139 |
| 5,837,945 | 11/1998 | Cornwell et al. | 177/136 |
| 5,837,946 | 11/1988 | Johnson et al. | 177/136 |

FOREIGN PATENT DOCUMENTS 0 154 728  9/1985  European Pat. Off. .
30 20 323 A1  12/1981  Germany .

*Primary Examiner*—Randy W. Gibson
*Attorney, Agent, or Firm*—Buchanan Ingersoll, P.C.

[57] ABSTRACT

A method and device for determining the weight of a load while the load is being lifted by a lift or fork, typically in a lift-return cycle. Loadcell sensors are located close to the lift assembly with each loadcell sensor containing strain gauges attached to weigh posts to take measurements of forces acting in a multiple number of axes. The weight of the load can be calculated using these multi-axis measurements. The ratio of the forces acting in the different axes is used to correlate the measurements taken while the load is lifted and while the load is returned. The analog signals from the strain gauges are converted to digital signals by a analog-digital converter located in the loadcell sensor and transmitted to a computer which calculates the weight of the load with the use of a calibration table.

39 Claims, 15 Drawing Sheets

DYNAMIC LOAD WEIGHING SYSTEM

FIELD OF THE INVENTION

This invention relates generally to the field of load weighing systems, and in particular, to the use of strain gauges to weigh a load, for example, when a load is being emptied as in a refuse or waste dumping situation.

BACKGROUND OF THE INVENTION

Load weighing systems are generally known in the art. They have been used, in one application, in the weighing of loads carried by waste trucks. The need for accurate weighing systems in this industry are known and include the fact that waste carriers are charged an amount based on the weight dumped in landfill sites. The waste carriers in turn would also like to charge their customers on a per weight basis as this would be more fair and cost-effective.

It is also important to know the load that a waste truck carries because of concerns of weight restrictions on many roadways and fines resulting from trucks being overweight.

The impending development of a charge imposed on residential users for the pick-up of their domestic garbage, again on a per weight basis, has focused the need to develop an accurate and efficient load weighing system.

The load weighing systems of the prior art typically use load cells or they measure indirect forces in these applications. A load is placed, for example, on a fork lift assembly of a waste truck and measurements are taken. The load cells in the prior art systems generally isolate and measure forces acting in one axis only, being typically the vertical axis, and attempt to compensate, in their measurements, for forces acting in other axes. Prior art systems have also been used to measure indirect forces such as forces acting within the hydraulic cylinders used to lift the fork and forces on the arm of waste trucks.

Many problems have been encountered with the use of load cell systems which attempt to isolate forces acting in a single axis. When the waste truck is emptying a container, problems such as uneven placement of material in the container, containers moving during the lift cycle and the rough operation of the hydraulic system with acceleration and deceleration forces make weighing-in-motion very difficult. These factors must be compensated for through the use of additional devices such as inclinometers to locate the preferred angles for measurement; accelerometers or devices which allow for smooth acceleration; complicated mathematical algorithms involving calculations of centers of gravity; software extrapolations; and calibration curves. These additional methods or devices possess inherent error factors and therefore contribute greater error to single axis weighing systems.

There have been many solutions disclosed in the prior art directed to load weighing systems, but all suffer from drawbacks. Waste trucks typically have arms or forks which engage, lift, empty and return containers or bins to the ground in a cycle. The preferred time to measure the weight of the load is usually during this cycle. Typically, these waste trucks contain powerful machinery and hydraulic cylinders in order to be able to lift large loads. Weighing systems which require the stopping or slowing down of the arms or forks in order to measure the load of the weight during the cycle suffer from several problems. There is firstly an unacceptable time loss with these systems; this type of static weighing reduces the productivity of the waste truck. There are secondly large vibrations generated by this type of system which cause wear and tear and premature breakdown of the parts associated with these systems. These drawbacks add costs to the systems which have been found to be unacceptable. U.S. Pat. No. 4,645,018 to Garbade is an example of such a system.

Other weighing systems which have been proposed involve measuring fluid pressure or other variable forces in the hydraulic cylinders used to lift the load. These systems measure variables remote from the load and therefore larger inaccuracies will result from external factors such as acceleration of the fork and fluctuation of the hydraulic pump. This type of system typically includes calculations and algorithms based on assumed centers of gravity or methods of measuring centers of gravity. Due to the remoteness of the measurements, the influence of external forces, and factors such as off-center loads, these types of weighing systems are not as accurate and efficient as desirable. Examples of these systems are illustrated in U.S. Pat. No. 4,771,837 and U.S. Pat. No. 5,178,226.

There have also been weighing systems proposed which utilize a vertical load cell. The load cells are located such that the load is placed upon these cells. However, these cells tend to suffer from unacceptable wear and tear because of the large loads which are placed upon them. Examples of these devices are illustrated in U.S. Pat. Nos. 4,645,018 and 4,714,122.

Other systems have also been disclosed, as in U.S. Pat. No. 5,245,137 which utilize strain gauges mounted on areas of the waste truck remote of the load. These systems also involve frequent calibrations of sensors. The remote location of the strain gauges means that the strain must travel a great distance to be sensed by the strain gauges. Consequently, the measurements are indirect and their accuracy will be affected by other factors. One such factor is the physical properties of the lift arms where the strain gauges are typically mounted. This will have a great impact on accuracy as the lift arms possess individual characteristics which vary from arm to arm and truck to truck. These types of weighing systems have led to inconsistent weight results with errors in the range of +/−1 to 10% per lift. Any change in the characteristic of the lift arms, for instance, cracks on the arms, welds on the arm, plates welded to the arm, and temperature defined changes affect the strain profile and lead to a wider range of inaccuracies which are not acceptable. These systems also rely on frequent calibration of the load cells in order to compensate for many of these factors and to achieve some degree of accuracy. The frequent recalibration of the systems have been found to be inefficient and impractical.

Weighing systems used in the prior art also have had problems with cable noise, signal distortion and generally with communication of the signal from the load cell to the computer where the data is processed and the weight calculated. Typically, analog signals are generated by the load cell and transmitted to the computer along long cables which run the length of the entire truck and sometimes twice the length of the truck. The integrity of the analog signals are generally affected by factors such as vibration, bends in the cable and engine noise. These factors directly affect the accuracy of the weighing system.

When using single axis systems in order to determine the weight of loads, some but not all of the external forces can be compensated for with software extrapolations, angle measuring devices and accelerometers. There remains, however, components of error due to the external forces, due to the load cells themselves and due to the devices and extrapolations used to compensate for the external forces.

Errors in these prior art devices can range from +/−1 to 10% per lift which is not acceptable. As a waste truck is generally rated to lift up to 9000 lbs of refuse, it can readily be seen that on a per pound basis large ranges of error can result in waste truck operators or their clients losing a lot of money. Therefore, an accurate load weighing system would be desirable.

According to one aspect of the present invention there is provided a method for determining a weight of a load using a lift assembly comprising a weight bearing portion, at least one loadcell sensor, located on or adjacent to the weight bearing portion, wherein each loadcell sensor comprises at least one weigh post and a plurality of strain gauges operatively connected to each weigh post to take measurements of forces acting on the weight posts, the method comprising:

pre-calibrating the loadcell sensors of the lift assembly and generating a calibration table;

lifting the load with the lift assembly;

continuously taking strain gauge measurements of the forces acting on the weigh posts in at least two different axes while the load is being lifted;

taking multi-axis force measurements at at least one pre-determined position while the load is being lifted; and calculating the weight of the load using the multi-axis force measurements and the calibration table wherein accurate weights of loads can be repeatedly determined without pre-calibrating the loadcell sensors and generating a new calibration table before each subsequent weight determination.

According to a second aspect of the present invention, there is provided a method for determining a weight of a container, engaged by a lift assembly that travels through a lift-return cycle wherein the lift assembly comprises a weight bearing portion, at least one loadcell sensor located on or adjacent to the weight bearing portion and comprising at least one weigh post and a plurality of strain gauges operatively connected to each weigh post to take measurements of forces acting on the weigh posts, the method comprising:

pre-calibrating the loadcell sensors of the lift assembly and generating a calibration table;

causing the lift assembly to travel through the lift-return cycle which comprises lifting the container and returning the container;

continuously taking strain gauge measurements of the forces acting on the weigh posts in at least two different axes throughout the lift-return cycle;

taking multi-axis force measurements at at least one predetermined position while the container is lifted; and calculating the weight of the material using the multi-axis force measurements and the calibration table, wherein accurate weights of containers can be repeatedly determined without precalibrating the loadcell sensors and generating a new calibration table before each subsequent weight determination.

According to a third aspect of the present invention there is provided a method for determining a weight of a container engaged by a lift assembly that travels through a lift-return cycle and of material in the container, wherein the lift assembly comprises a load bearing portion, at least one loadcell sensor located on or adjacent to the weight bearing portion, each loadcell sensor having at least one weigh post, and a plurality of strain gauges operatively connected to each weigh post to take measurements of forces acting on the weigh posts, the method comprising:

pre-calibrating the loadcell sensors of the lift assembly and generating a calibration table;

causing the lift assembly to travel through the lift-return cycle which comprises lifting the container, emptying the material from the container and returning the container;

continuously taking strain gauge measurements of the forces acting on the weigh posts in at least two different axes throughout the lift-return cycle;

taking first multi-axis force measurements of at least one predetermined first position while the container and material are lifted;

taking second multi-axis force measurements at at least one pre-determined second position while returning the container, wherein the second position correlates to the first position; and calculating the weight of the material and of the container using the first and second multi-axis force measurements and the calibration table, wherein accurate weights of material and containers can be repeatedly determined without pre-calibrating the loadcell sensors and generating a new calibration table before each subsequent weight determination.

According to a fourth aspect of the invention, there is provided an apparatus for weighing a load being lifted by a lift assembly having a weight bearing comprising:

at least one loadcell sensor position on or adjacent to the weight bearing portion of the lifting assembly wherein each loadcell sensor comprises at least one weigh post;

a plurality of strain gauges operatively connected to each weigh post to take measurements of forces acting on the weigh post in at least two different axes; and calculating means for calculating the weight of the load using the strain gauge measurements of the forces and for pre-calibrating the loadcell sensors to generate a calibration table, wherein accurate weights of loads can be repeatedly determined without pre-calibrating the loadcell sensors and generating a new calibration table before each subsequent weight determination.

BRIEF DESCRIPTION OF THE DRAWINGS

Reference will now be made, by way of example only, to embodiments of the present invention with reference to the following drawings in which.

DETAILED DESCRIPTION OF THE PREFERRED EMBODIMENT

Figure 1:
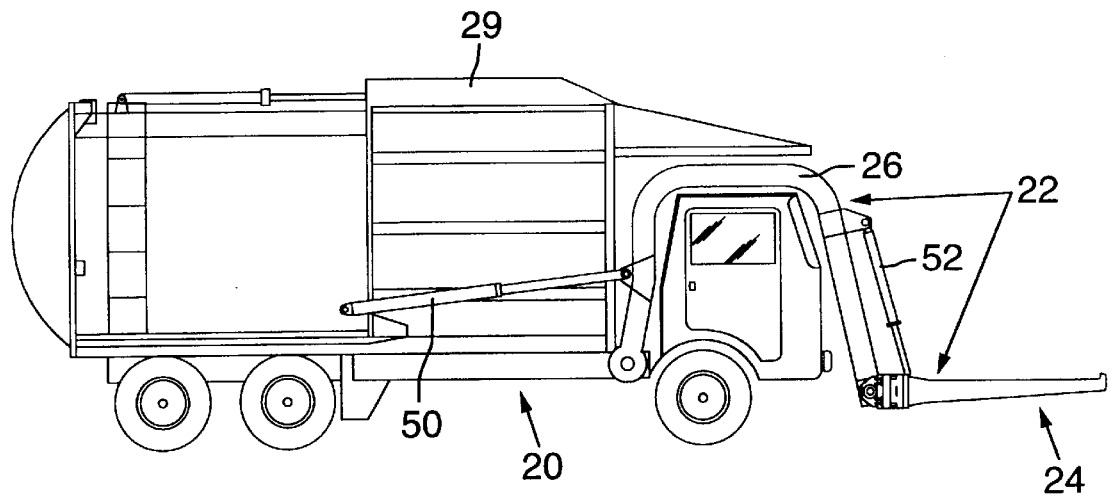
FIG. 1 is a side perspective view of a front end loading waste truck having one embodiment of the dynamic load weighing system according to the present invention.

Referring to FIG. 1, one embodiment of the present invention is illustrated, and in particular a waste truck 20 and an arm and fork means 22 is shown. Although the particular embodiments described here are for use with refuse or waste trucks, it will be understood that the use of the present invention is not limited to such applications, but rather can include any case where the weight of a load must be determined.

Figure 2:
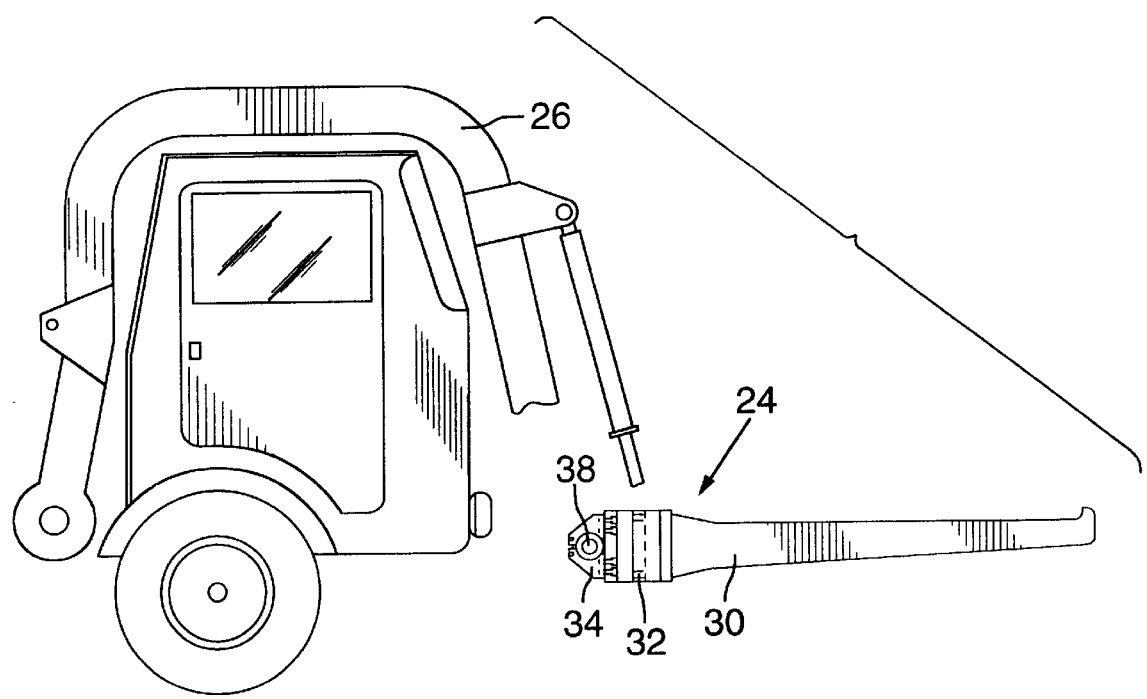
FIG. 2 is a side perspective view illustrating the front end of the waste truck and the fork assembly of the embodiment of FIG. 1.

Referring to FIG. 2, the numeral 24 generally refers to a lift or fork assembly. There are two fork assemblies 24 pivotally attached to two lift arms 26. As the two fork assemblies 24 and two lift arms 26 are identical, only one of the fork assemblies 24 and lift arms 26 will be described below.

Figure 6:
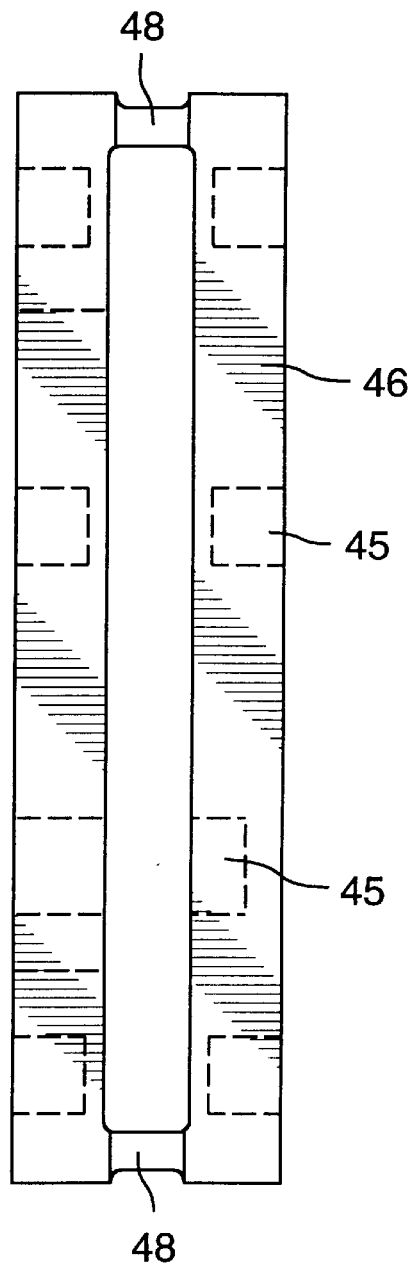
FIG. 6 is a top view of the loadcell of FIG. 4.

The fork assembly 24 is pivotally connected to lift arms 26. The fork assembly 24 generally engages a sleeve 27 of a container 28 in a horizontal fashion as illustrated in FIG. 6. The operator of the waste truck 20, causes the fork assembly 24 to slide into the sleeves 27 of the container 28, lifts the container 28 with the lift arms 26, brings the container 28 over the cab of the truck 20 and empties the container 28 into the body portion 29 of the waste truck 20 and returns the container 28 to its original position. This is generally referred to as the lift-return cycle.

Hydraulic lift cylinders 50 and 52 as illustrated in FIG. 1 are pivotally mounted to the waste truck 20 and to the lift arms 26. Through extension and retraction of the cylinders 50 and 52, the lift arms 26 are able to lift and lower the fork assembly 24 and consequently the container 28 when so engaged.

Figure 2A:
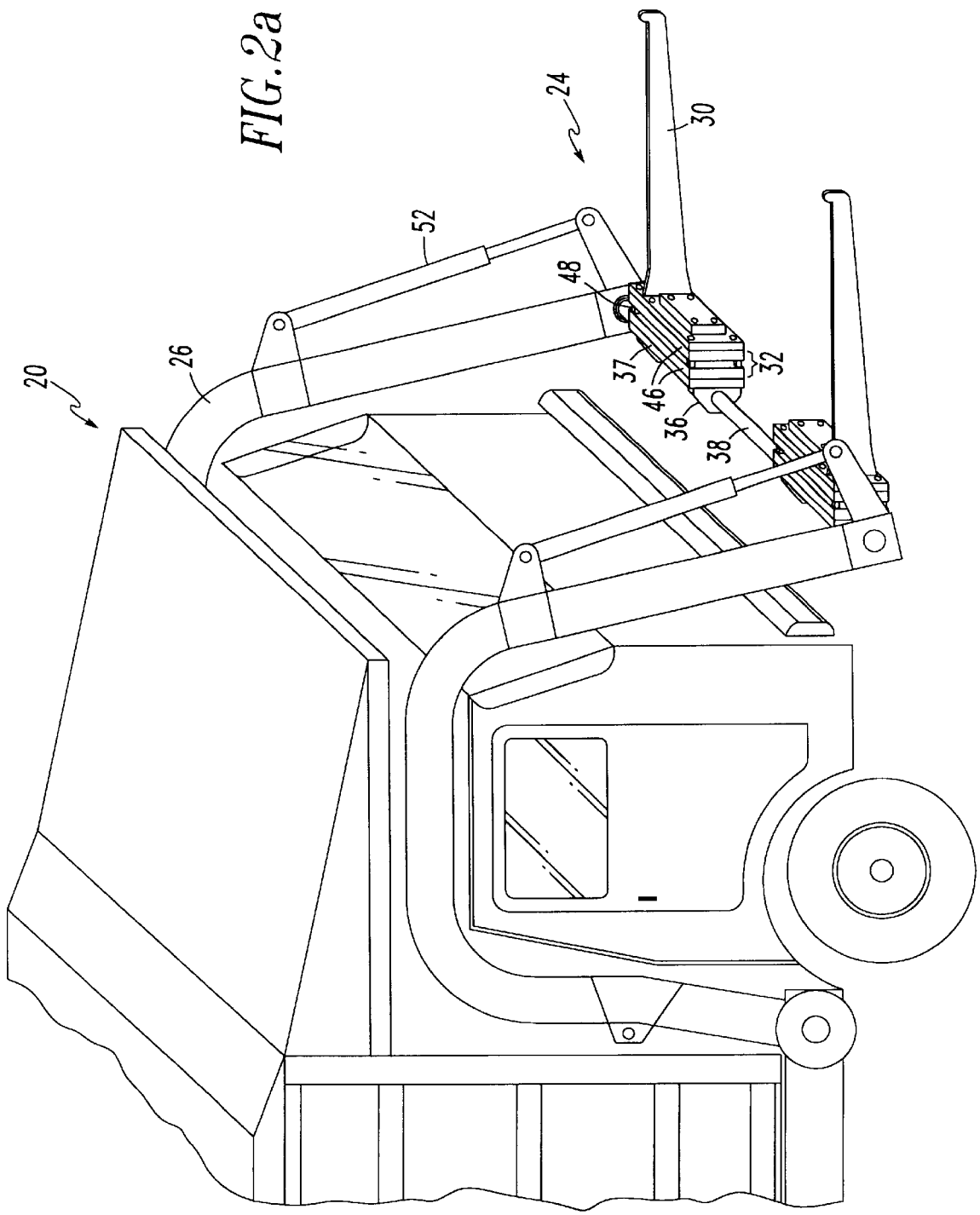
FIG. 2a is a perspective view of the fork assembly in the embodiment of FIG. 1.
Figure 3:
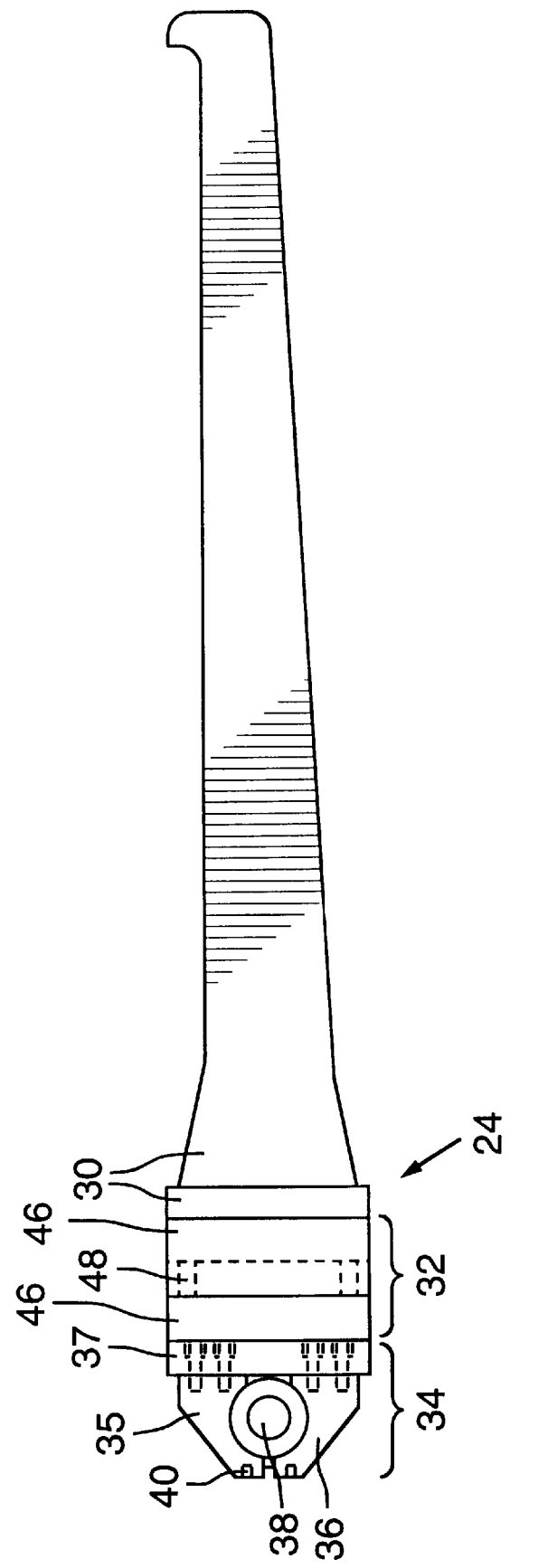
FIG. 3 is a side perspective view of the fork assembly of FIG. 2.
Figure 4:
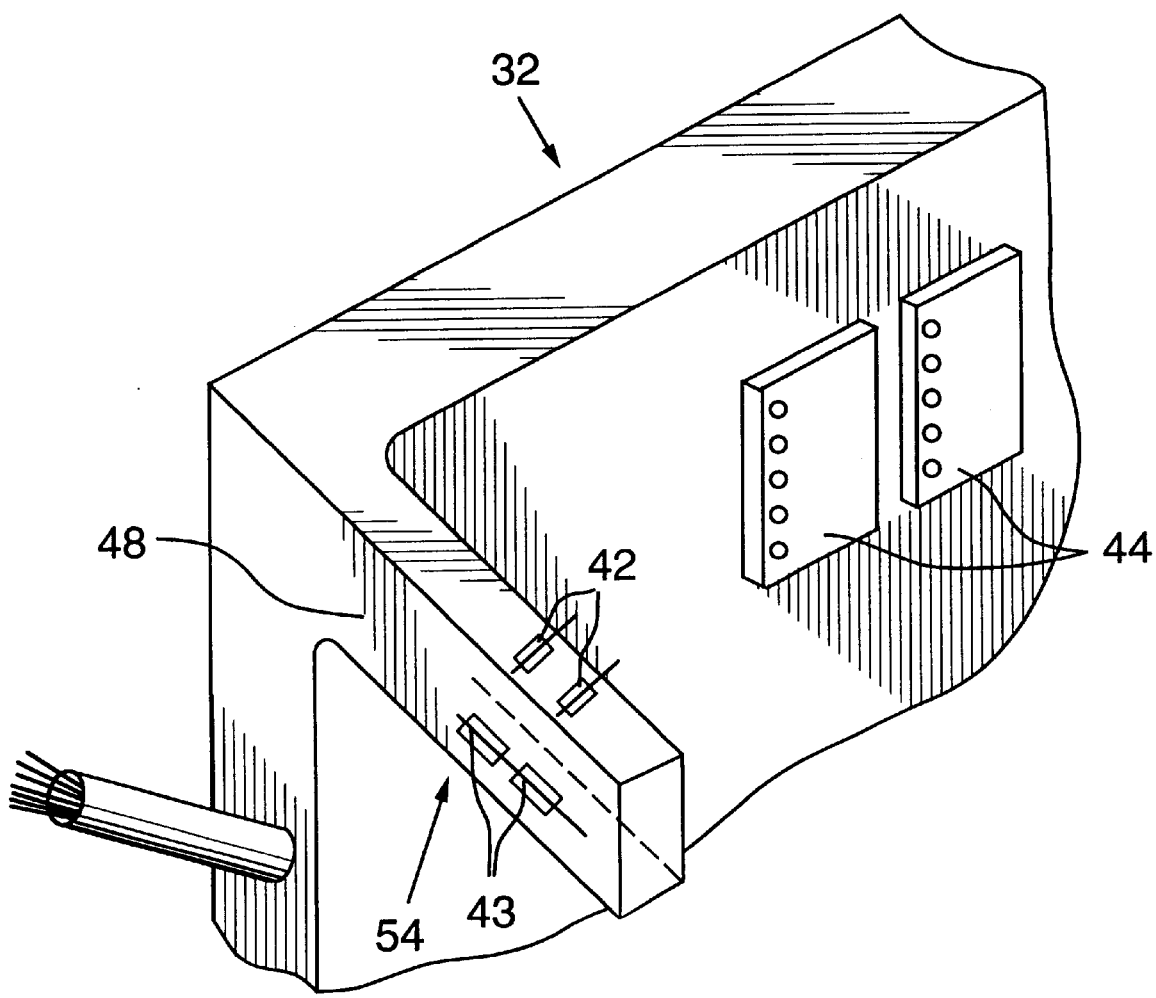
FIG. 4 is a perspective view of the loadcell sensor of FIG. 3, illustrating the weigh posts, strain gauges and analog-digital converters.
Figure 5:
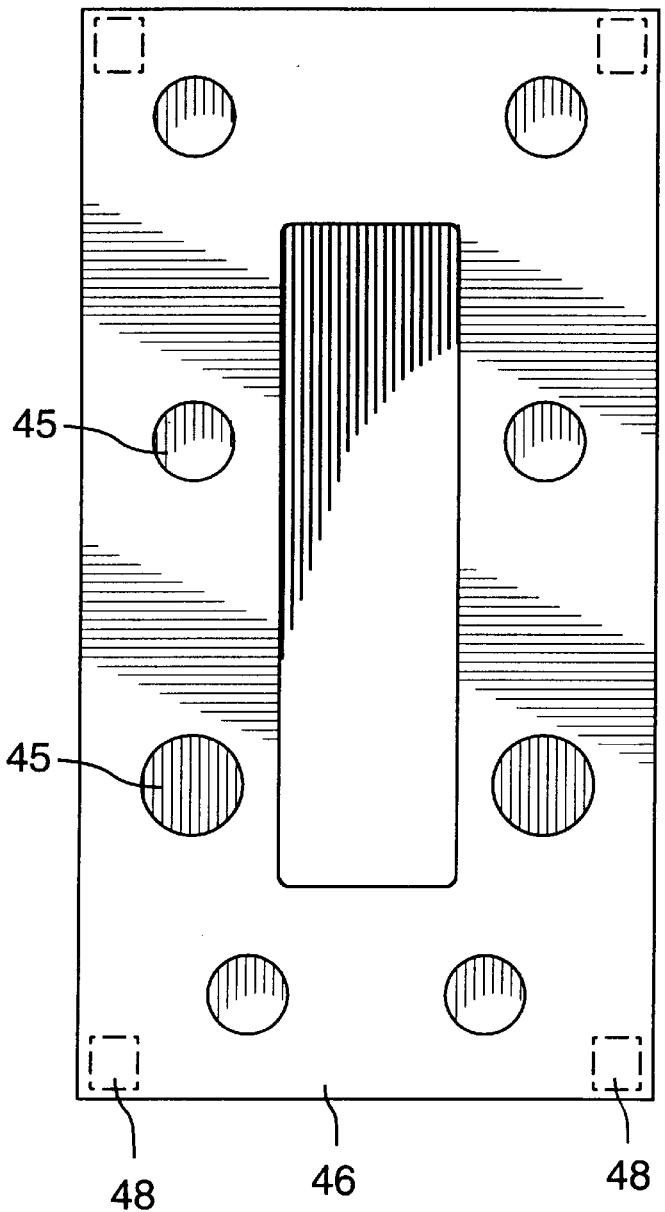
FIG. 5 is a front perspective view of the loadcell plate of FIG. 4.

The fork assembly 24 as illustrated in FIGS. 2 and 2a, comprises generally a fork 30 which is the load bearing portion of the fork assembly 24, a loadcell sensor 32 and a sensor plate assembly 34. The sensor plate assembly 34 is comprised of an upper torque tube support 35, a lower torque tube support 36 and a sensor plate 37. The sensor plate assembly 34 is attached to the truck torque tube 38, which in turn is attached between the lift arms 26 of the truck 20. A pinch bolt 40 is used to secure the sensor plate assembly 34 into a level position and then welded into place. The sensor plate assembly 34, the loadcell sensor 32 and the fork 30 are sequentially attached to each other. Referring to FIGS. 5 and 6, a loadcell plate 46 defines a series of apertures 45 through which the loadcell plate 46 is attached to the sensor plate assembly 34 and to the fork 30.

Referring to FIGS. 3–6, the loadcell sensor 32 comprises a block of metal out of which material is removed from the central portion wherein two loadcell plates 46 and four weigh posts 48 are formed. It will be appreciated by those skilled in the art that this metal can be of various types and in this embodiment of the present invention, the load cell sensor 32 is made of stainless steel.

The loadcell sensor 32 further comprises four sensor arrays 54, each comprising a weigh post 48 to which strain gauges 42 and 43 are attached. Within each sensor array 54, the strain gauges 42, 43 take first measurements with respect to a first axis and second measurements with respect to a second axis located 90° from the first axis. It will be appreciated that measurements for a third axis can be determined mathematically or a third pair of strain gauges can be used in order to measure the third axis.

The loadcell sensor 32 further comprises two analog-digital converters 44. Strain gauges 42 and 43 contained in the four sensor arrays 54 take measurements with respect to the first and second axes and send their respective signals to each of the analog-digital converters 44.

When a load is placed on the fork 30, such as when the container 28 is engaged and lifted, the force of the load is transferred to the loadcell sensor 32. As the container 28 is lifted, the load that is placed on the fork plate 30 generates a strain that is detected by the strain gauges 42 and 43 in the loadcell sensors 32. Analog signals corresponding to this strain are then sent from the strain gauges 42 and 43 to the analog-digital converters 44. The location of the loadcell sensor 32, being directly adjacent to the fork 30, minimizes the path that the strain travels prior to being sensed by the strain gauges 42 and 43 and therefore results in greater accuracy.

The strain gauges 42 used in this embodiment typically have a rated +/− error of 0.1%. The prior art devices have typically used larger weldable gauges which have a rated +/− error in the range of 1%. Strain gauges used in this embodiment can be obtained from Measurements Group Inc., Raleigh, N.C., U.S.A.

Figure 7:
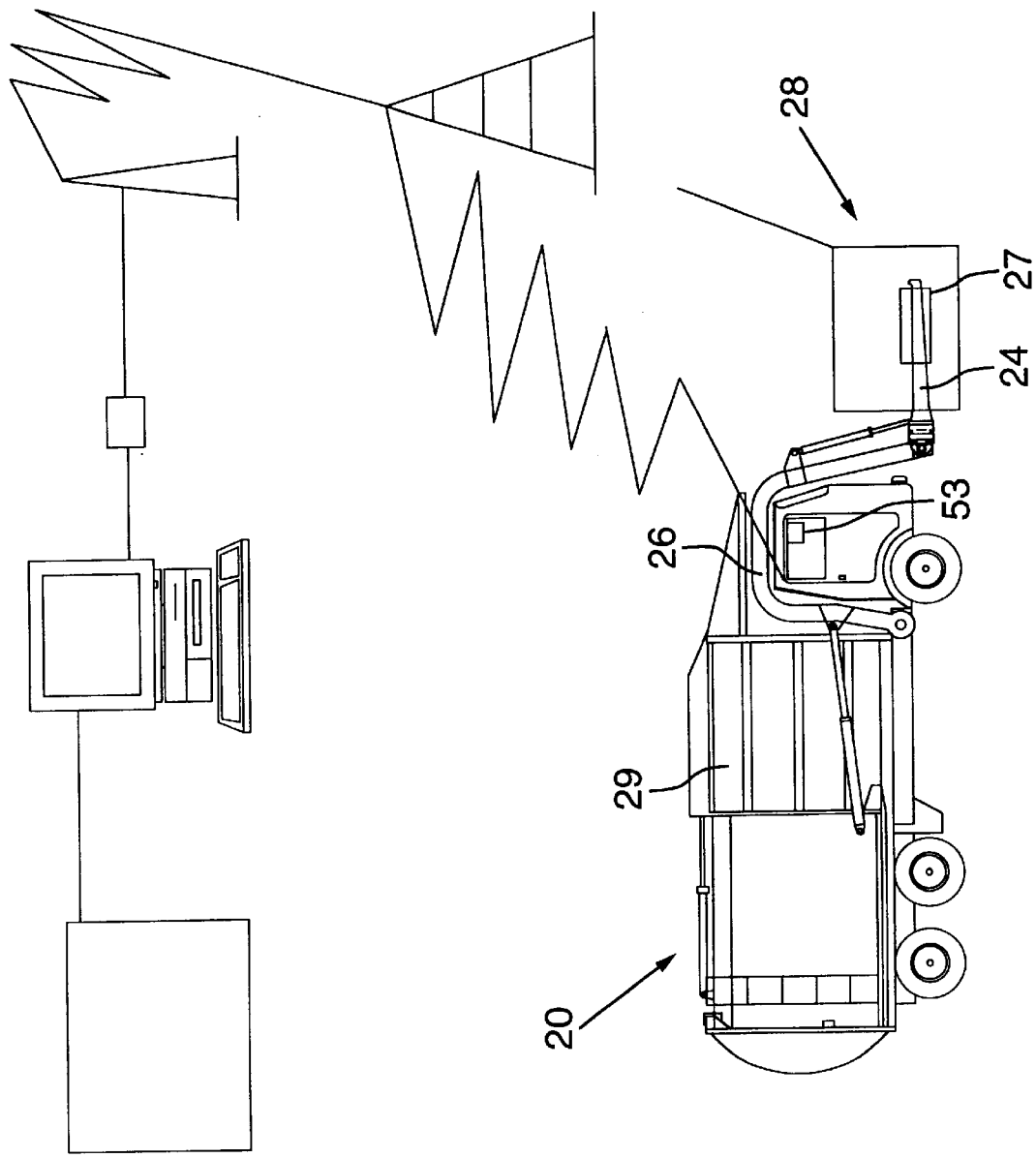
FIG. 7 is a schematic of the signal transmission in the embodiment of FIG. 1.
Figure 8:
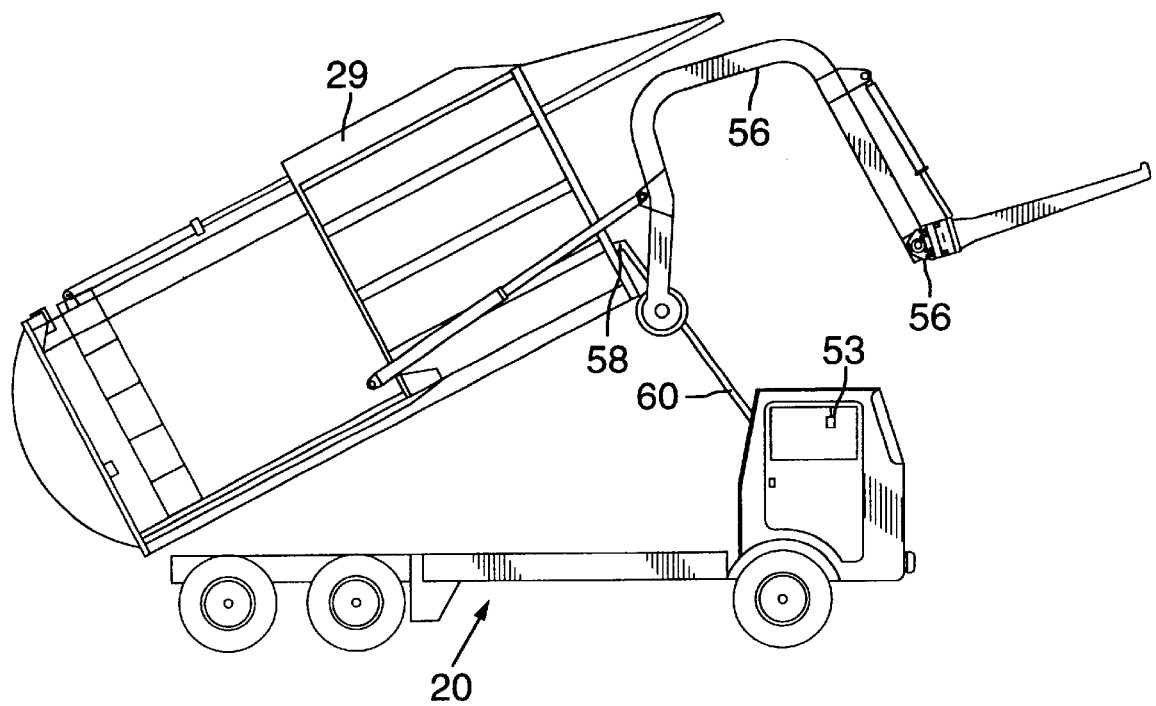
FIG. 8 is a side view of the embodiment of FIG. 1 illustrating the body portion of the waste truck in a pivoted position.
Figure 9:
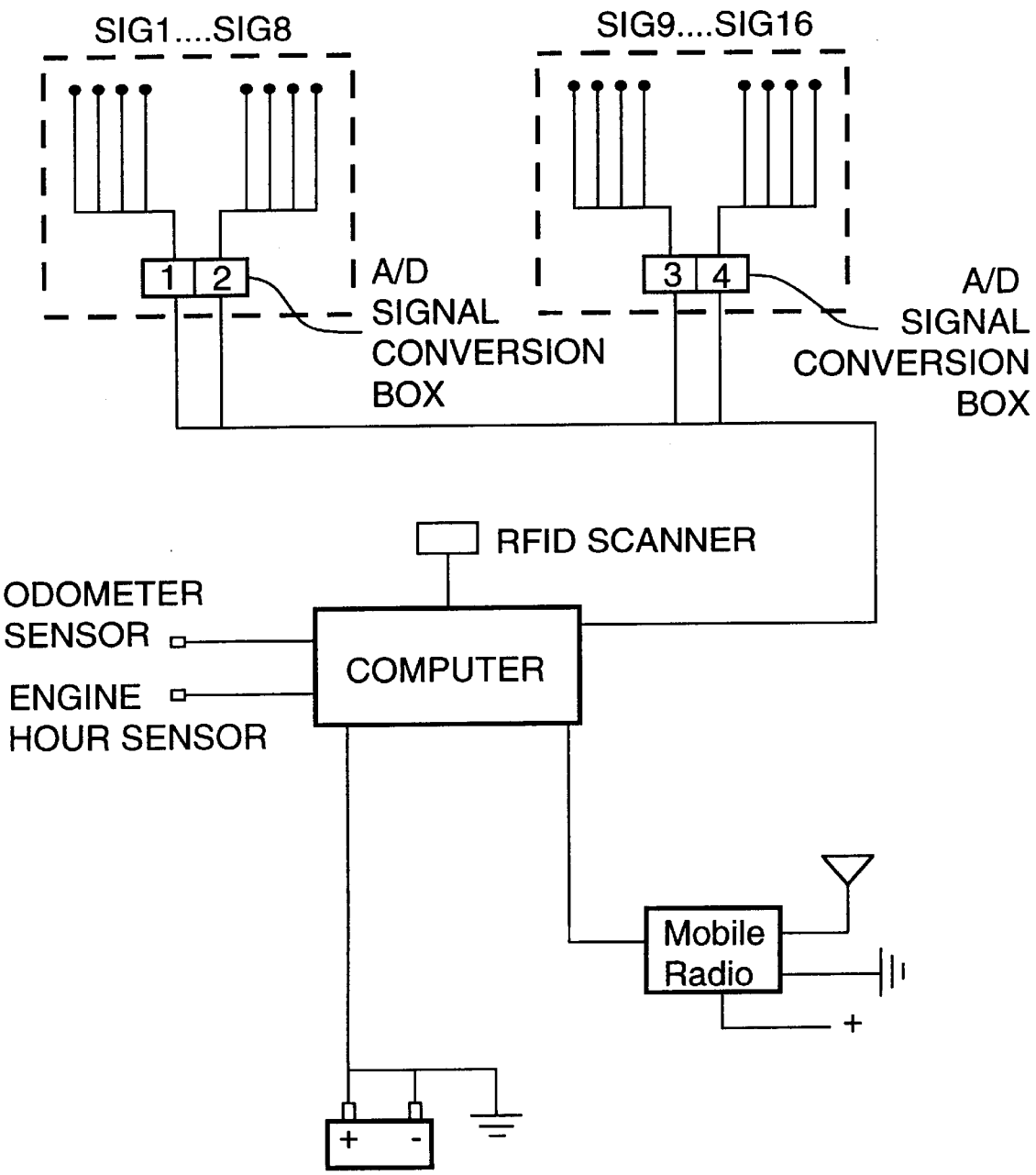
FIG. 9 is a schematic of the circuitry in the embodiment of FIG. 1.

The location of the analog-digital converters 44 within the loadcell sensor also minimizes the distance over which the analog signals produced by the strain gauges 42 and 43 are sent. The analog signals are converted to digital signals by the analog digital converter 44 which are then transmitted via a sensor cable 56 to a cable junction box 58 and then relayed via a retractable sensor cable 60 to a computer 53 which can be located remote from the loadcell sensor 32 as illustrated in FIG. 8. The conversion of the signal from an analog format to a digital format within the loadcell sensor 32 allows the transmission of digital signals which increases the accuracy of the system as the integrity of digital signals, unlike analog signals, is less affected by such factors as vibration, bends in the cable or engine noise. The digital data is received by a computer 53 which can be located in the waste truck 20, for example, in the cab of the truck 20. This data is processed and the weight of the load can be calculated and this information along with other information such as customer identification, odometer readings and engine hour readings can be transmitted to further destinations by wireless modem if desired. The circuitry and signal transmission are schematically outlined in FIG. 7 and FIG. 9.

It will be appreciated by persons skilled in the art that once the signals are converted to digital signals within the loadcell sensor, they can be transmitted via wireless technology such as a wireless modem, instead of by the cable 60, to the computer 53 located in the cab of the truck or to a location remote from the truck itself, for instance directly to an office. It will further be appreciated by those skilled in the art that the data sensed by the strain gauges can be processed and the weight of the load calculated within the loadcell sensor itself and the information then transmitted to a desirable location.

When the waste truck 20 empties its contents into a landfill site, the body portion 29 of the truck 20 pivots about a point located near the rear of the truck 20 as shown in FIG. 8. Prior art systems which send analog signals from strain gauges located, for example on the lift arm, currently run sensor cables down the lift arm towards the body of the truck, lengthwise down the body of the truck towards the rear of the truck, around a pivot point at the end of the truck, lengthwise down the body of the truck towards the front of the truck, around a pivot point near the front of the truck and into the cab to connect to a computer located in the cab in order to account for the pivoting movement of the truck's body and cab. The cable in prior art devices is therefore generally quite long, and in some devices almost twice the length of the waste truck. These factors affect the accuracy of the analog signals transmitted.

Referring to FIG. 8, the transmission of digital signals allows the retractable sensor cable 60 to be used as digital signals are less affected than analog signals by severe bends in the cable 60. When the truck's 20 contents are emptied and the truck body 29 is pivoted, the retractable sensor cable 60 extends and when the truck body 29 is returned to its initial position, the cable 60 retracts. This reduces the length of cable needed, the amount of potential breaks in the cable resulting from wear and tear and the amount of money and time spent on repairs.

Figure 10:
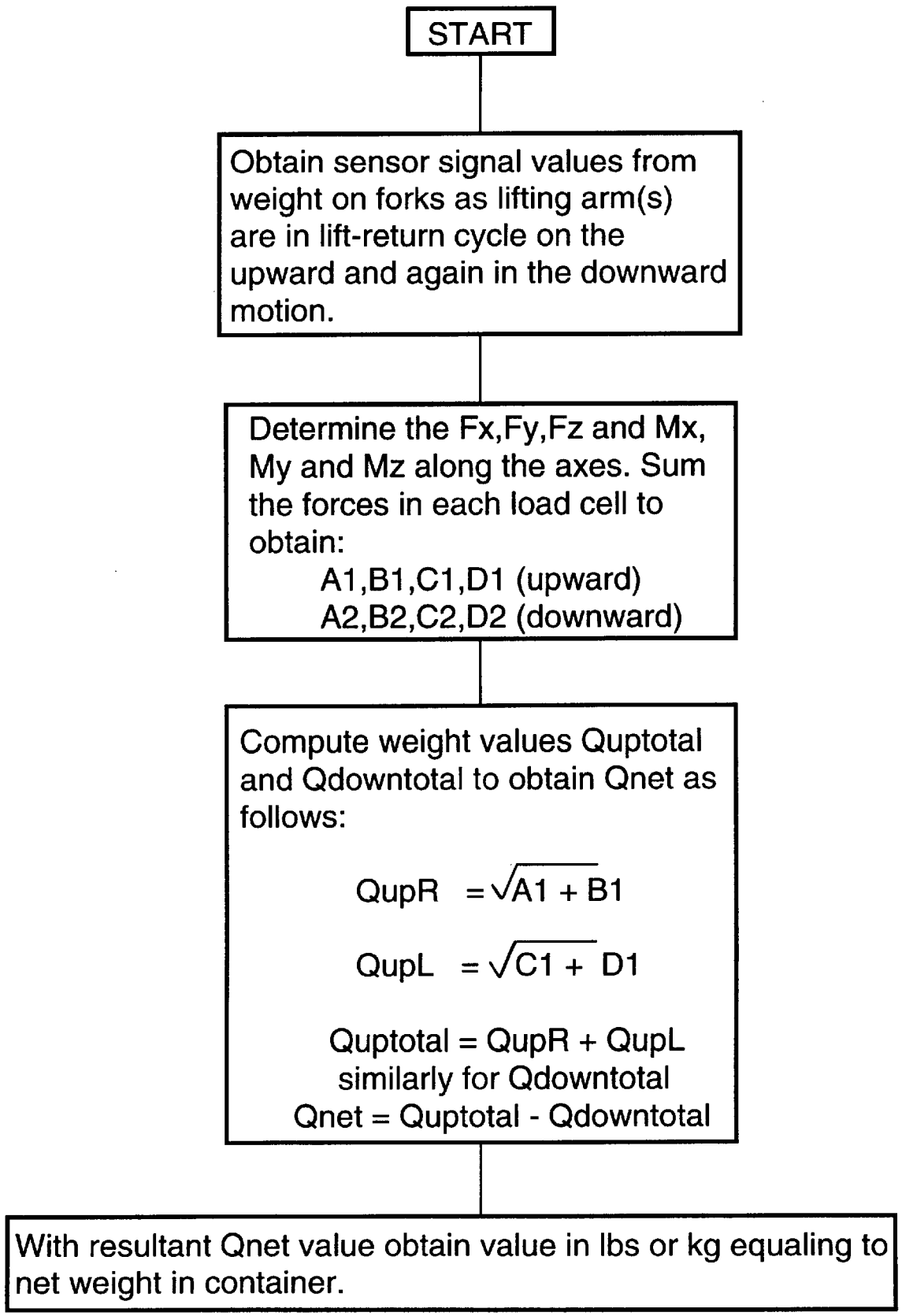
FIGS. 10–11 are flow charts of some of the steps of one method of the present invention.
Figure 11A:
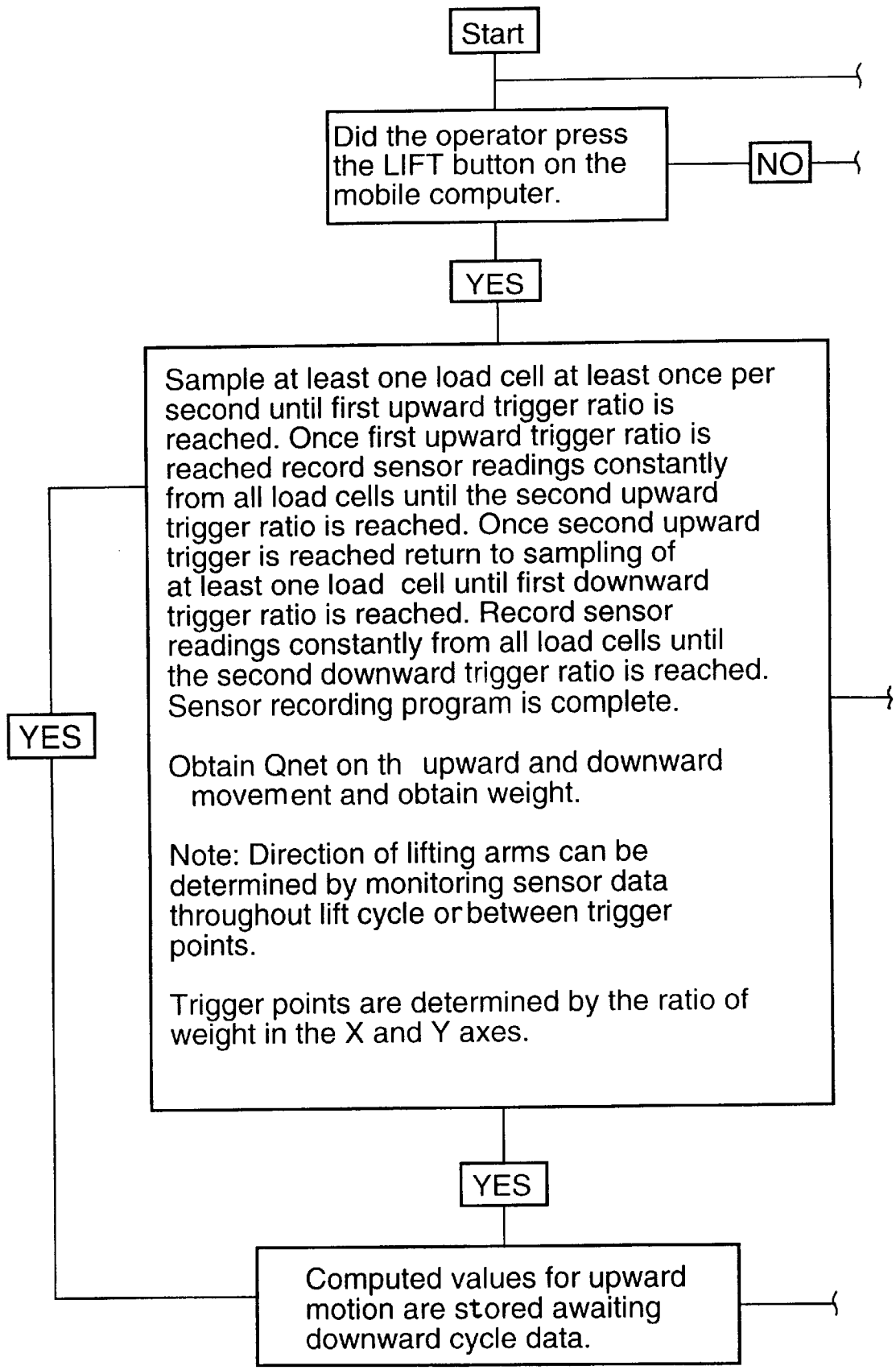
Figure 11B:
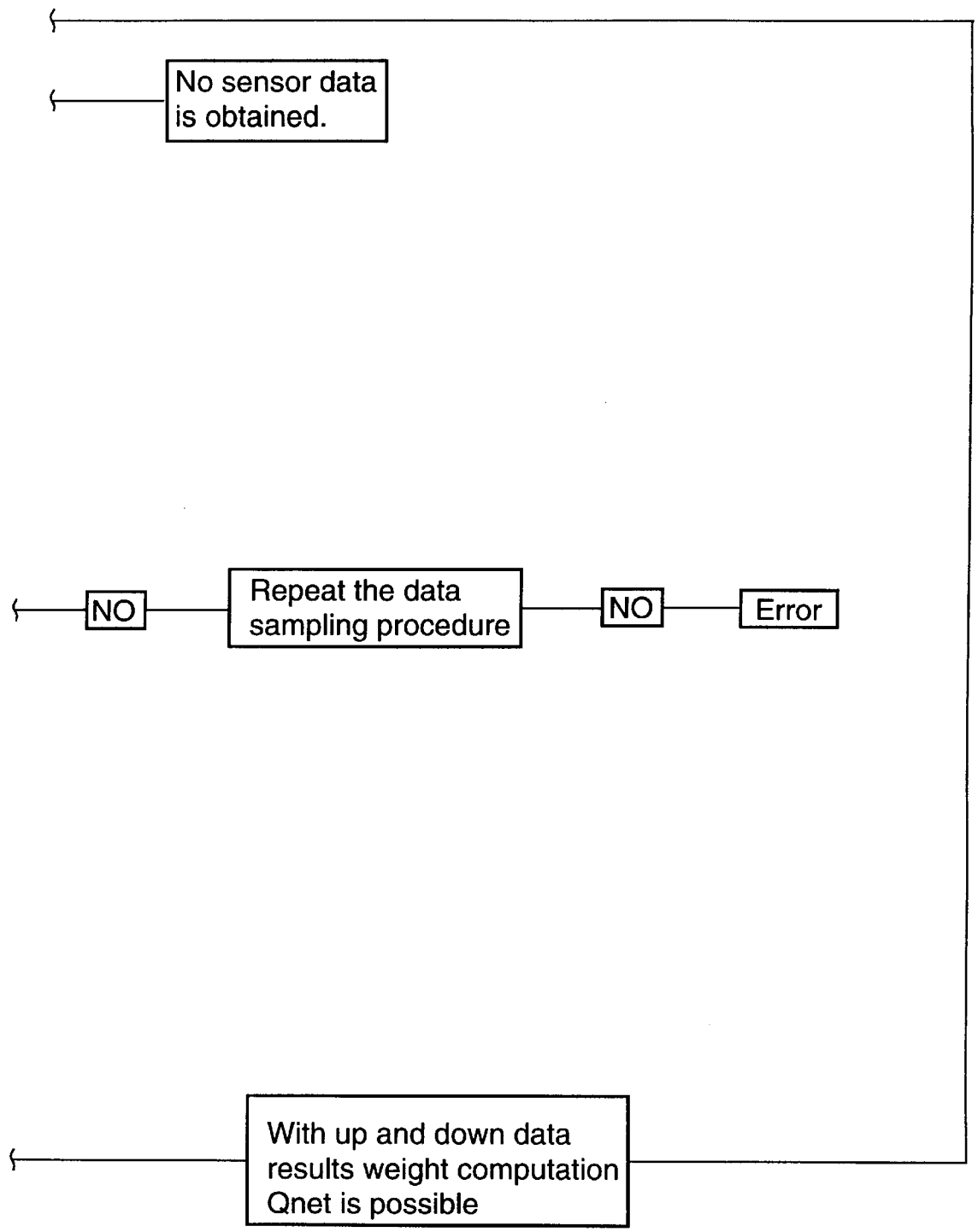

The processing steps used to calculate the weight of the load are outlined in FIGS. 10–11. Strain measurements are taken during the lift cycle and calculations made of forces and moments around the X and Y axes by strain gauges 42, 43. At each point of a typical lift cycle there are components of forces and moments which act around the X and Y axis (and the Z axis). Calculations utilizing these measurements can determine for instance a certain position during the lift cycle where a first value can be obtained and for the same position during the return cycle where a second value can be obtained in order to calculate the weight of the material being emptied. In other words, the positions where measurements are taken can be correlated through determining relationships, such as ratios, of the forces and moments acting in different axes.

Prior art devices have used inclinometers to measure for example, the angles of lift arms, in order to determine the point during the lift cycle and during the return cycle to take measurements. The embodiment of the present invention eliminates the need for inclinometers. While it is preferred to calculate the weight of the load at certain points during the lift cycle and at certain points during the return cycle, it is understood that measurements can be taken at any point after the container has been lifted, prior to it being emptied or after the container has been emptied, prior to it being returned to its original starting position in order to determine the weight of the load. It will also be understood that taking measurements at a range of positions can improve the accuracy of the system.

The value corresponding to the weight of the material and container 28 being lifted, referred to in FIG. 10 as Quptotal, can then be calculated using these measurements and a pre-calibrated table. Similarly values are taken from the return cycle to obtain a Qdowntotal value. A Qnet value is then obtained by subtracting Quptotal from Qdowntotal and Qnet is compared to a pre-calibrated table to obtain the net weight of the material emptied from the container.

It will be apparent to those skilled in the art that forces and moments along various axes can be determined mathematically with the data measured by the strain gauges 42. These measurements and computations can be compared to a pre-calibrated table in order to determine the weight of the load being lifted. A typical set of equations used in the calibration of a system with two independent sensor signals (for example, two signals from two analog-digital converters located in a load cell) might appear as follows:

$$F(x)=K0+K1(\text{sig1})+K2(\text{sig2})$$

$$F(y)=L0+L1(\text{sig1})+L2(\text{sig2})$$

$$F(z)=N0+N1(\text{sig1})+N2(\text{sig2})$$

$$M(x)=P0+P1(\text{sig1})+P2(\text{sig2})$$

$$M(y)=R0+R1(\text{sig1})+R2(\text{sig2})$$

$$M(z)=S0+S1(\text{sig1})+S2(\text{sig2})$$

In these equations, where (Kx . . . Sx) represent experimentally defined calibration constants, the forces and moments about the x, y and z axes can be found by solving these 6 equations which contain data from two independent sensor signals (sig1 . . . sig2). It will also be readily apparent to those skilled in the art that forces and torques, other than those measured about an axis can produce inadvertent signals referred to as "cross talk" and that equations containing higher order inverse transfer functions can be written to correct for non-linear load/signal transfer characteristics or to correct for other effects, such as temperature on a continuous basis.

Because the loadcell sensor 32 is placed directly adjacent to the fork 30, factors which have contributed to the range of error in prior art systems have been minimized. For instance, the distance that the strain has to travel has been minimized and the physical properties of the lift arm, such as cracks or welds will have little effect on the strain measured by the loadcell sensor 32. Once an initial calibration table is generated, there will be little need for frequent calibration of the loadcell sensors.

The multi-axis loadcell sensor 32 as used in the present invention has the ability to measure all of the forces acting during the lift cycle and is capable of computing an accurate weight for the load. Since the multi-axis loadcell sensor 32 has the capability to directly measure forces in the X, Y and Z axes and consequently moments about the Mx, My and Mz axes, the measurements can be used to accurately and efficiently calculate the weight of a load. Single axis load cell devices, on the other hand, which attempt to measure forces in one axis suffer from off-axis loading inaccuracies and errors contributed through the use of inclinometers, accelerometers, complicated mathematical algorithms and calibration curves. The removal of these devices or steps decreases the amount of possible error and inaccuracy in the system.

Figure 12:
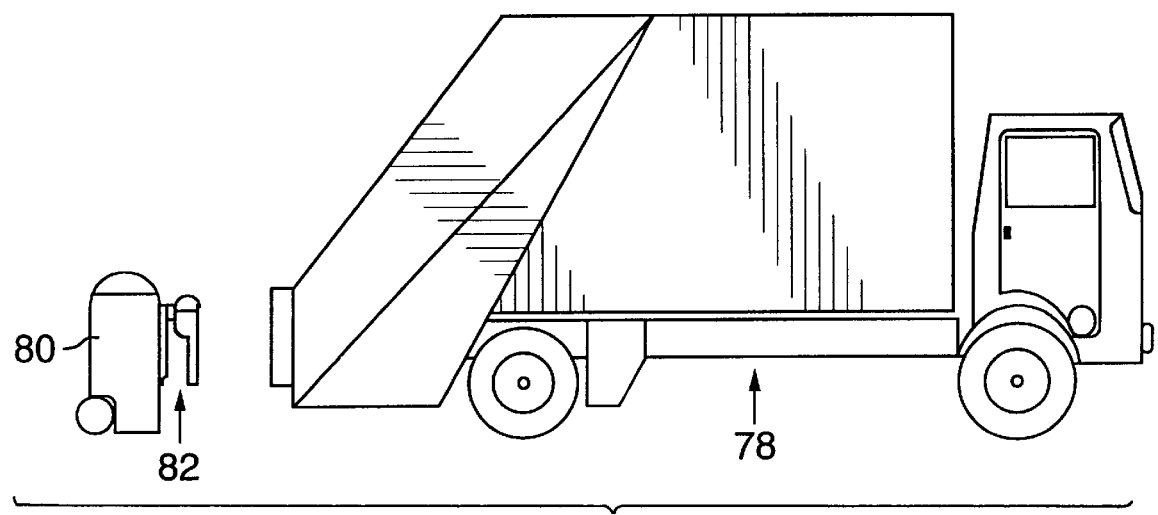
FIG. 12 is a side perspective view of a rear end loading truck of a second embodiment of the present invention.

FIGS. 12–15 illustrate a second embodiment of the present invention. This embodiment can be used to determine the weight of refuse emptied from smaller containers 80, for instance in a residential or recycling situation, into a rear loading waste truck 82 as illustrated in FIG. 12.

Figure 13:
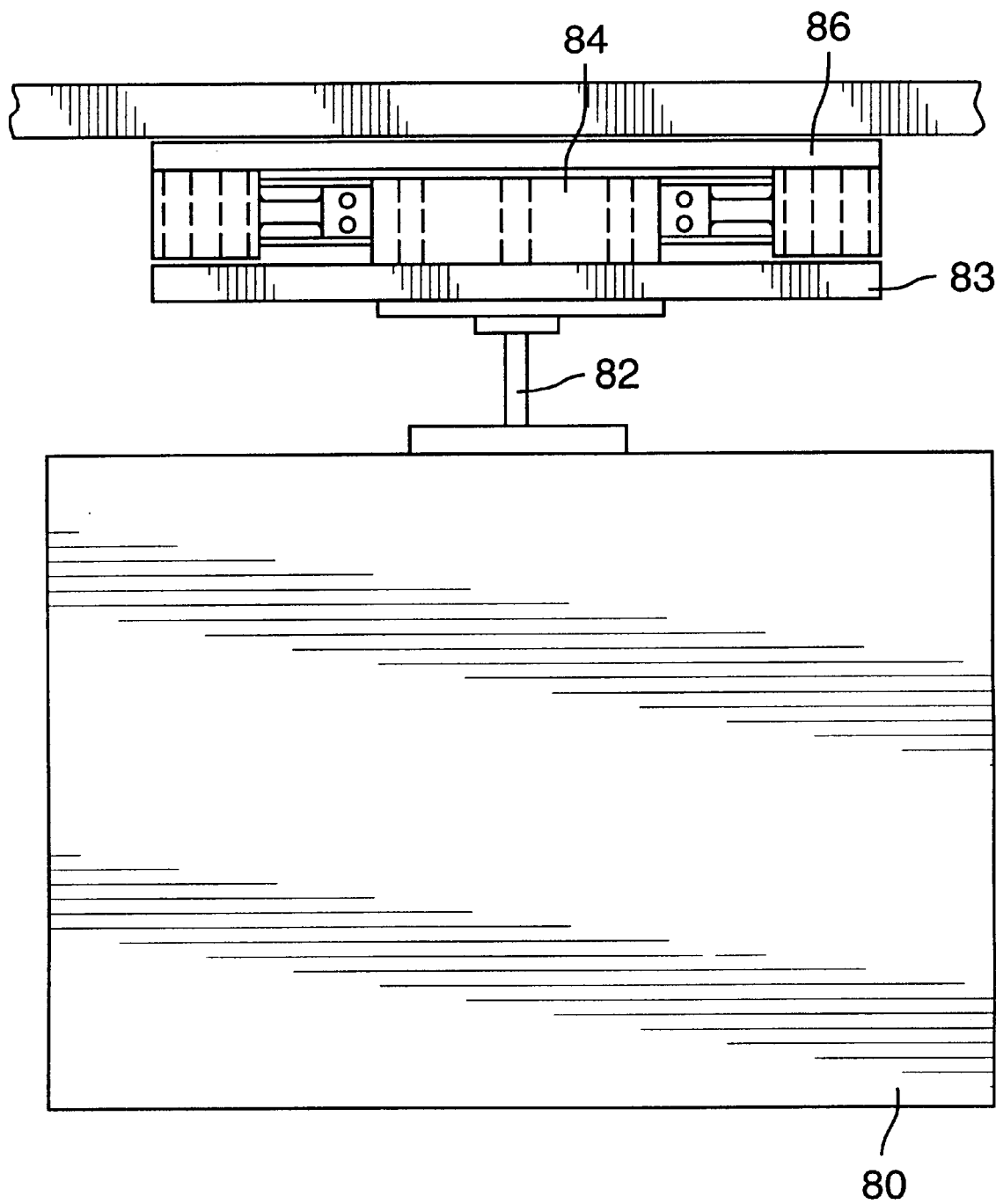
FIG. 13 is a top perspective view of the second embodiment of the present invention.
Figure 14:
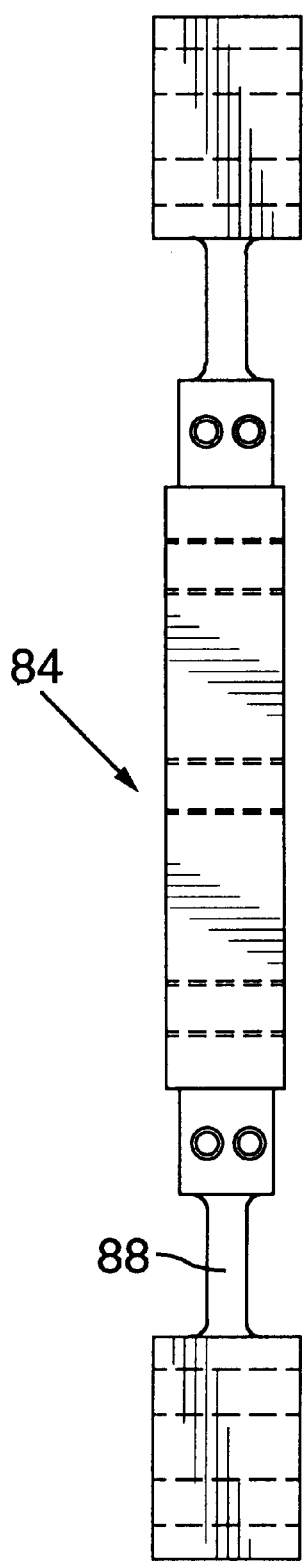
FIGS. 14 and 15 are top and front perspective views, respectively, of the load cell assembly of the second embodiment of the present invention.
Figure 15:
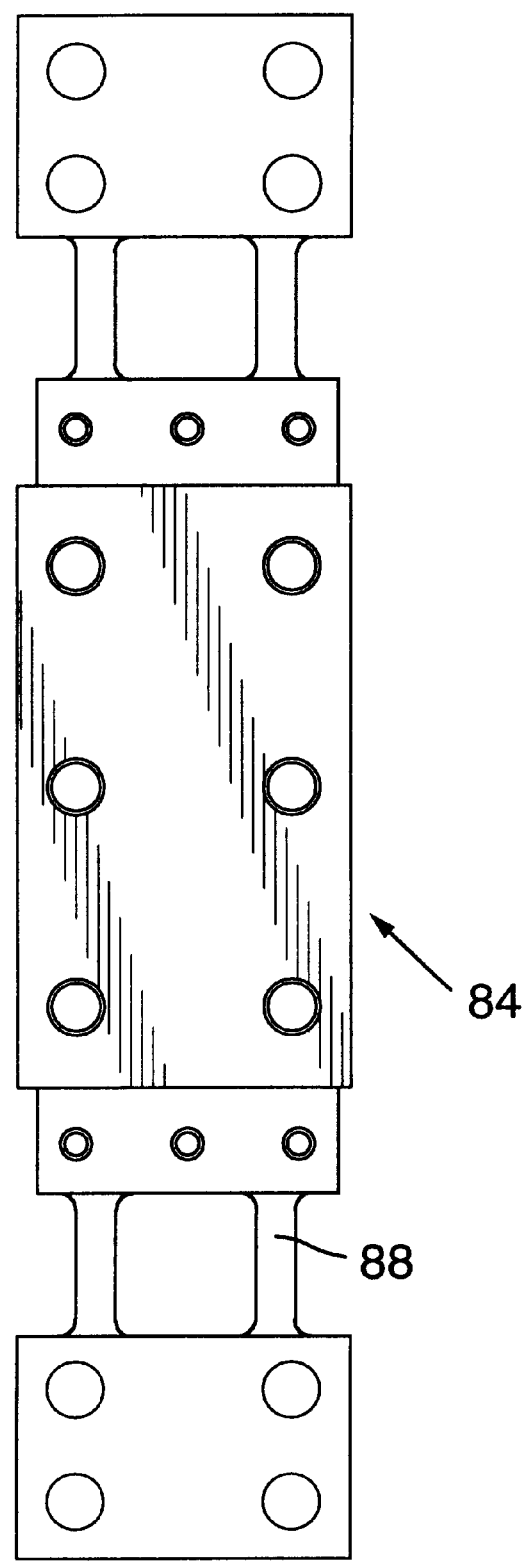
Figure 16:
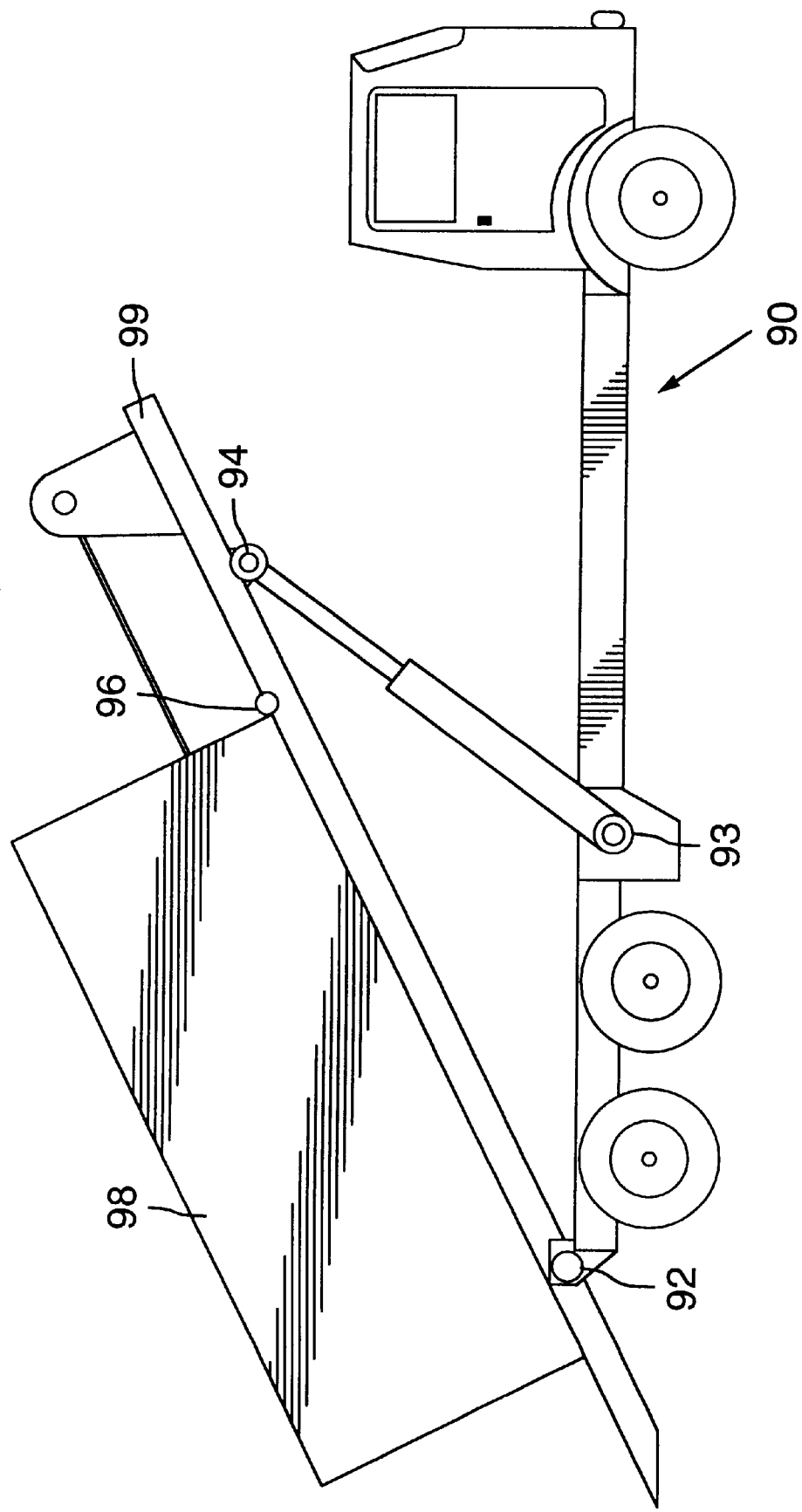
FIG. 16 is a side perspective view of a roll-off waste truck having a third embodiment of the present invention.

Referring to FIGS. 13–15, the container 80 is lifted by a generic lifting arm assembly represented by the numeral 82, for instance one manufactured by Equipment Labrie Ltee, Quebec, Canada. The weight of the contents of the container 80 is determined during the lift-return cycle. A sensor mounting plate 86 is attached to the rear of the waste truck 78. Attached to the sensor mounting plate 86 is a loadcell sensor 84. The lifting arm assembly 82 is then attached to a lifting arm assembly plate 83 which is attached to the loadcell sensor 84. This type of lifting arm and load cell assembly can also be used in side and front loading residential and recycling waste trucks.

When the container 80 is lifted, the strain caused by the load of the container 80 on the lifting arm assembly 82 is transmitted to and sensed by strain gauges located in the loadcell sensor 84. The strain gauges are mounted on weighing posts 88 as in the first embodiment. Measurements can be taken when the container 80 is being lifted with respect to forces acting in a plurality of axes. The points of measurement can again be correlated through determining relationships, such as ratios, of the forces and moments acting in different axes. The weight of the load can be calculated from these measurements.

The loadcell sensor 84 further comprises an analog-digital converter similar to the first embodiment so as to immediately convert the signal produced by the strain gauge into a digital signal. This signal can then be sent to a computer located in the cab of the truck or located remote to the truck. The device for and method of determining the weight in the second embodiment is similar to that described for the first embodiment.

FIG. 14 illustrates a third embodiment of the present invention that can be adapted for use on a typical roll-off waste truck 90. Loadcell sensors are placed on both sides of the truck, however, as the placement of the loadcell sensors will be identical on both sides, only one side as illustrated in FIG. 14 will be described. Rear loadcell sensors 92 are placed as shown and the front loadcell sensors 93 and 94 can be placed at either or both of the locations represented by the numerals 93 or 94. A trip switch 96 identifies when the roll-off container is completely off the ground so as to begin the method of determining the weight of the load.

When the container 98 is lifted, the strain caused by the load of the container 98 on the platform 99 of the truck 90 is transmitted to and sensed by strain gauges located in the rear loadcell sensors 92 and the front loadcell sensors, 93 and 94. Strain gauges are mounted on weighing posts similar to the first embodiment. Measurements of multi axis forces acting on the strain gauges can be taken once the container 98 is lifted completely off the ground. The points of measurement can again be correlated through determining relationships, such as ratios, of the forces and moments acting in different axes. The weight of the load can be calculated from these measurements. The method of determining the weight in the third embodiment is similar to that described for the first embodiment.

Other variations and modifications of the invention are possible. For example, the placement of identification elements on the containers, or the use of the present invention in the mining, construction and farming industries, in for example, loaders, escavators and cranes in order determine the weight of loads lifted are two such variations. All such modifications or variations are believed to be within the sphere and scope of the invention as defined by the claims appended hereto.

The embodiments of the invention in which an exclusive property or privilege is claimed is defined as follows:

1. A method for determining a weight of a load using a lift assembly comprising a weight bearing portion, at least one loadcell sensor located on or adjacent to the weight bearing portion, wherein each loadcell sensor comprises at least one weigh post, and a plurality of strain gauges operatively connected to each weigh post to take measurements of forces acting on the weigh posts, the method comprising:

pro-calibrating the loadcell sensors of the lift assembly and generating a calibration table;

lifting the load with the lift assembly;

continuously taking strain gauge measurements of the forces acting on the weigh posts in at least two different axes while the load is being lifted;

taking multi-axis force measurements at at least one pre-determined position while the load is being lifted; and calculating the weight of the load using the multi-axis force measurements and the calibration table, wherein accurate weights of loads can be repeatedly determined without precalibrating the loadcell sensors and generating a new calibration table before each subsequent weight determination.

2. The method as claimed in claim 1, wherein the multi-axis force measurements are taken at a plurality of pre-determined positions.

3. A method as claimed in claim 1, wherein the pre-calibration step includes compensating for errors caused by cross-talk prior to generating the calibration table.

4. The method as claimed in claim 3, wherein the multi-axis force measurements are taken at a plurality of pre-determined positions.

5. A method as claimed in claim 3 further comprising the steps of:

a) converting the strain gauge measurements and the multi-axis force measurements to digital signals; and b) transmitting the digital signals to a processing unit where the weight of the load is calculated.

6. The method as claimed in claim 5, wherein the strain gauge measurements and the multi-axis force measurements are converted to the digital signals within the loadcell sensor.

7. The method as claimed in claim 1 further comprising the steps of:

a) converting the strain gauge measurements and the multi-axis force measurements to digital signals; and b) transmitting the digital signals to a processing unit where the weight of the load is calculated.

8. The method as claimed in claim 7, wherein the strain gauge measurements and the multi-axis force measurements are converted to the digital signals within the loadcell sensor.

9. A method for determining a weight of a container engaged by a lift assembly that travels through a lift-return cycle, wherein the lift assembly comprises a weight bearing portion, at least one loadcell sensor located on or adjacent to the weight bearing portion and comprising at least one weigh post, and a plurality of strain gauges operatively connected to each weigh post to take measurements of forces acting on the weigh posts, the method comprising:

pre-calibrating the loadcell sensors of the lift assembly and generating a calibration table;

causing the lift assembly to travel through the lift-return cycle which comprises lifting the container and returning the container;

continuously taking strain gauge measurements of the forces acting on the weigh posts in at least two different axes throughout the lift-return cycle;

taking multi-axis force measurements at at least one predetermined position while the container is lifted; and calculating the weight of the material using the multi-axis force measurements and the calibration table, wherein accurate weights of containers can be repeatedly determined without precalibrating the loadcell sensors and generating a new calibration table before each subsequent weight determination.

10. A method as claimed in claim 9, wherein the pre-calibration step includes compensating for errors caused by cross-talk prior to generating the calibration table.

11. The method as claimed in claim 10 wherein the second position is correlated to the first position by:
   calculating a first ratio of the strain gauge measurements during lifting of the container and material;
   calculating second ratios of the strain gauge measurements while returning the container; and
   identifying when the second ratios are equal to the first ratio.

12. The method as claimed in claim 11 wherein the first and second ratios are calculated using ratios of the strain gauge measurements of the forces acting in a first axis to the strain gauge measurements of the forces acting in a second axis.

13. The method as claimed in claim 12 wherein the first and second multi-axis force measurements are taken at a plurality of first and second pre-determined positions, respectively.

14. A method for determining a weight of a container engaged by a lift assembly that travels through a lift-return cycle and of material in the container, wherein the lift assembly comprises a load bearing portion, at least one loadcell sensor located on or adjacent to the weight bearing portion, each loadcell sensor having at least one weigh post, and a plurality of strain gauges operatively connected to each weigh post to take measurements of forces acting on the weigh posts, the method comprising:
   pre-calibrating the loadcell sensors of the lift assembly and generating a calibration table;
   causing the lift assembly to travel through the lift-return cycle which comprises lifting the container, emptying the material from the container and returning the container;
   continuously taking strain gauge measurements of the forces acting on the weigh posts in at least two different axes throughout the lift-return cycle;
   taking first multi-axis force measurements of at least one predetermined first position while the container and material are lifted;
   taking second multi-axis force measurements at at least one predetermined second position while returning the container, wherein the second position correlates to the first position; and
   calculating the weight of the material and of the container using the first and second multi-axis force measurements and the calibration table,
   wherein accurate weights of material and containers can be repeatedly determined without pre-calibrating the loadcell sensors and generating a new calibration table before each subsequent weight determination.

15. A method as claimed in claim 14, wherein the pre-calibration step includes compensating for errors caused by cross-talk prior to generating the calibration table.

16. The method as claimed in claim 13, wherein the first and second multi-axis force measurements are taken at a plurality of first and second predetermined positions, respectively.

17. The method as claimed in claim 15, further comprising the steps of converting the strain gauge measurements to digital signals and transmitting the digital signals to a processing unit where weights of the material and of the container are calculated.

18. The method as claimed in claim 17, wherein the strain gauge measurements and multi-axis measurements are converted to digital signals within the loadcell.

19. The method as claimed in claim 17, wherein the second position is correlated to the first position by:
   calculating a first ratio of the strain gauge measurements during lifting of the container and material;
   calculating second ratios of the strain gauge measurements while returning the container; and
   identifying when the second ratios equal the first ratio.

20. The method as claimed in claim 19, wherein the first and second ratios are calculated using ratios of the strain gauge measurements of the forces acting, in a first axis to the strain gauge measurements acting in a second axis.

21. The method as claimed in claim 20, wherein the first and second multi-axis force measurements are taken at a plurality of first and second predetermined positions, respectively.

22. The method as claimed in claim 18, further comprising the steps of converting the strain gauge measurements to digital signals and transmitting the digital signals to a processing unit where weights of the material and of the container are calculated.

23. The method as claimed in claim 16, further comprising the steps of converting the strain gauge measurements to digital signals and transmitting the digital signals to a processing unit where weights of the material and of the container are calculated.

24. The method as claimed in claim 23, wherein the second position is correlated to the first position by:
   calculating a first ratio of the strain gauge measurements during lifting of the container and material;
   calculating second ratios of the strain gauge measurements while returning the container; and
   identifying when the second ratios equal the first ratio.

25. The method as claimed in claim 24, wherein the multi-axis force measurements are taken at a plurality of first and second pre-determined positions, respectively.

26. The method as claimed in claim 23, wherein the first and second ratios are calculated using ratios of the strain gauge measurements of the forces acting, in a first axis to the strain gauge measurements acting in a second axis.

27. The method as claimed in claim 26, wherein the multi-axis force measurements are taken at a plurality of pre-determined positions.

28. The method as claimed in claim 23, further comprising the steps of converting the strain gauge measurements to digital signals and transmitting the digital signals to a processing unit where weights of the material and of the container are calculated.

29. The method as claimed in claim 28, wherein the first and second multi-axis force measurements are taken at a plurality of first and second predetermined positions, respectively.

30. The method as claimed in claim 16, wherein the multi-axis force measurements are taken at a plurality of pre-determined positions.

31. The method as claimed in claim 30 further comprising the steps of:
   converting the strain gauge measurements and the multi-axis force measurements to digital signals; and
   transmitting the digital signals to a processing unit where the weight of the load is then calculated.

32. The method as claimed in claim 31 wherein the strain gauge measurements and the multi-axis force measurements are converted to digital signals within the loadcell sensor.

33. An apparatus for weighing a load being lifted by a lifting assembly having a weight bearing portion comprising:
- at least one loadcell sensor positioned on or adjacent to the weight bearing portion of the lifting assembly wherein each loadcell sensor comprises at least one weigh post;
- a plurality of strain gauges operatively connected to each weigh post to take measurements of forces acting on the weigh post in at least two different axes; and
- calculating means for calculating the weight of the load using the strain gauge measurements of the forces and for pre-calibrating the loadcell sensors to generate a calibration table,
- wherein accurate weights of loads can be repeatedly determined without precalibrating the loadcell sensors and generating a new calibration table before each subsequent weight determination.

34. An apparatus as claimed in claim 33 wherein the calculating means is a processing unit and further comprising at least one analog to digital converter located within the loadcell and means for transmitting the digital signals to the processing unit.

35. The apparatus as claimed in claim 34 wherein the transmitting means is a wireless transmitter.

36. The apparatus as claimed in claim 35 wherein the processing unit is located proximate the at least one analog to digital converter, the apparatus further comprising second processing means for transmitting information about the weight of the load from the processing unit to a second processing unit.

37. The apparatus as claimed in claim 36 wherein the means for calculating the weight is a processing unit.

38. The apparatus as claimed in claim 37 wherein the processing unit is located proximate the at least one analog to digital converter, the apparatus further comprising second means for transmitting information about the weight of the load from the processing unit to a second processing unit.

39. The apparatus as claimed in claim 38, wherein the second transmitting means is a wireless transmitter.

* * * * *